United States Patent
Nishimura

(10) Patent No.: US 7,885,367 B2
(45) Date of Patent: Feb. 8, 2011

(54) SYSTEM FOR ADJUSTING SAMPLING TIMING OF DLL CIRCUIT, METHOD THEREFOR AND TRANSMITTER-RECEIVER USED THEREFOR

(75) Inventor: Takahiro Nishimura, Tokyo (JP)

(73) Assignee: NEC Corporation, Tokyo (JP)

( * ) Notice: Subject to any disclaimer, the term of this patent is extended or adjusted under 35 U.S.C. 154(b) by 1064 days.

(21) Appl. No.: 11/345,498

(22) Filed: Feb. 2, 2006

(65) Prior Publication Data

US 2006/0176991 A1  Aug. 10, 2006

(30) Foreign Application Priority Data

Feb. 9, 2005  (JP) .............................. 2005-032404

(51) Int. Cl.
H03D 3/22 (2006.01)
H04L 27/22 (2006.01)

(52) U.S. Cl. ........................ 375/373; 375/357; 370/228; 327/144; 327/293

(58) Field of Classification Search ...................... 714/2, 714/5–7, 9–12; 370/216, 217–228, 241–242, 370/247; 375/224, 226, 316, 346, 349, 354, 375/357, 362, 368, 369, 371, 373, 376; 327/100, 327/141, 144–146, 155, 291–293
See application file for complete search history.

(56) References Cited

U.S. PATENT DOCUMENTS 5,155,483 A * 10/1992 Morimoto .................... 370/228

2002/0167897 A1 * 11/2002 Tateno et al. ................. 370/216
2003/0066006 A1 * 4/2003 Sharma ........................ 714/752
2005/0013393 A1 * 1/2005 Nishimura ................... 375/354

FOREIGN PATENT DOCUMENTS

JP   7-84946 A   3/1995

* cited by examiner

Primary Examiner—David C Payne
Assistant Examiner—James M Perez
(74) Attorney, Agent, or Firm—Sughrue Mion, PLLC

(57) ABSTRACT

An object of the present invention is to provide a DLL circuit adjustment system that can adjust the sampling timing of a DLL circuit without causing any increase of the number of interface signals or amount of coding overhead and any reduction of the data transfer efficiency. On a transmitter side, an ECC generating section adds an error detection/correction code to transmission data and outputs the transmission data with the error detection/correction code. Of output channels of the transmission data from the ECC generating section, a data bit associated with the DLL circuit to be adjusted is replaced with a sampling timing adjustment pattern using a to-be-adjusted channel selection circuit and a selector, and the resulting transmission data is transmitted to a receiver side. On the receiver side, the transmission data is received via a DLL circuit provided for each channel of the received transmission data, and an error detecting/correcting section corrects any error in the output of each DLL circuit, thereby forming received data. In this way, normal data transfer can be maintained while adjusting the sampling timing of each DLL circuit.

8 Claims, 5 Drawing Sheets

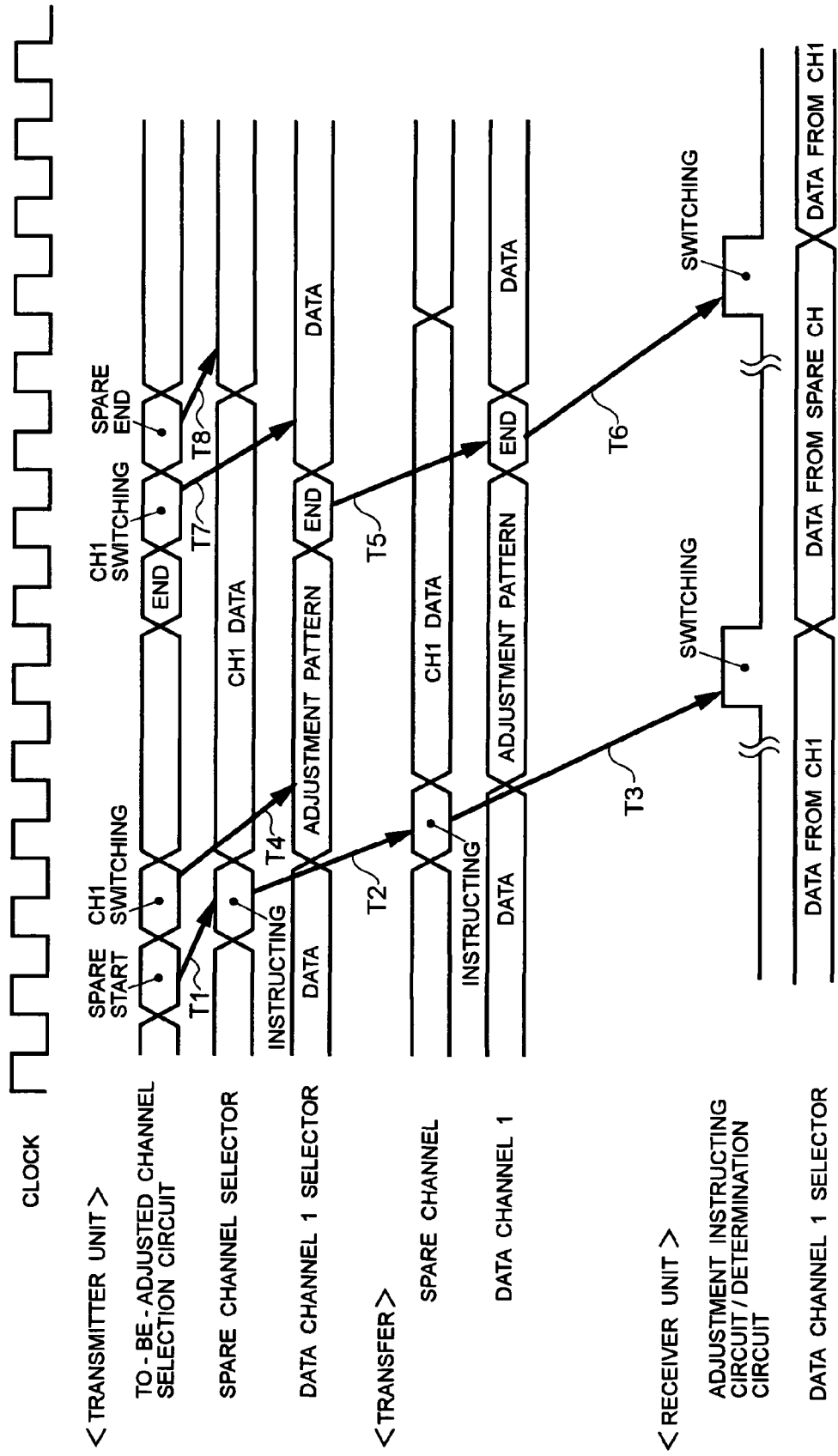

SYSTEM FOR ADJUSTING SAMPLING TIMING OF DLL CIRCUIT, METHOD THEREFOR AND TRANSMITTER-RECEIVER USED THEREFOR

BACKGROUND OF THE INVENTION

1. Field of the Invention

The present invention relates to a system for adjusting a sampling timing of a delay locked loop (DLL) circuit, a method therefor and a transmitter-receiver used therefor. In particular, the present invention relates to, in a data transmission system that uses the DLL circuit to achieve data synchronization between a transmitter side and a receiver side, a system for adjusting the sampling timing of the DLL circuit.

2. Description of the Prior Art

In recent data transmission between a transmitter and a receiver, a DLL circuit is used on the receiver side to achieve data synchronization while sampling received data (see Japanese Patent Laid-Open No. 7-84946). In this case, as the data transfer rate increases, the sampling timing of the DLL circuit may be shifted because of a temperature or voltage change, if data sequences having no data transition in the data pattern occur in succession.

Thus, for example, an 8B10B coding system may be used to suppress a shift of sampling timing of the DLL circuit. According to the 8B10B coding system, a data transition is caused intentionally. For example, if an original 8-bit data is data involving no data transition, such as data "00000000", the data is converted into 10-bit data, such as "1001110100". This advantageously prevents a shift of the sampling timing and an adverse effect of a signal pattern on a transmitted waveform, that is, the so-called inter-symbol interference (ISI).

BRIEF SUMMARY OF THE INVENTION

However, the conventional 8B10B coding scheme has the following problems. A first problem is that, since 8-bit data is converted into 10-bit data, redundant data equivalent to 20% of the original data has to be added, so that the number of interface signals and the amount of coding overhead increase, and the data transfer efficiency decreases. A second problem is that the latency is degraded due to data coding and decoding.

An object of the present invention is to provide a system for adjusting the sampling timing of a DLL circuit that can achieve the adjustment without causing any increase of the number of interface signals or amount of coding overhead and any reduction of the data transfer efficiency, a method therefor, and a transmitter-receiver used therefor.

Another object of the present invention is to provide a system for adjusting the sampling timing of a DLL circuit that can achieve high-rate data transfer without degrading the latency, a method therefor, and a transmitter-receiver used therefor.

According to the present invention, in a data transmission system that uses a DLL circuit to achieve data synchronization between a transmitter side and a receiver side, there is provided the system for adjusting the sampling timing of a DLL circuit, in which, on the transmitter side, the system comprises: error detection/correction code generating means for adding an error detection/correction code to transmission data and outputting the transmission data with the error detection/correction code; and means for transmitting, to the receiver side, output bits of the error detection/correction code generating means in which a data bit associated with the DLL circuit to be adjusted is replaced with a sampling timing adjustment pattern, and on the receiver side, the system comprises: a DLL circuit provided for each bit of received data; and error detecting/correcting means for receiving the output of each DLL circuit and performing error detection/correction thereon.

According to the present invention, in a data transmission system that uses a DLL circuit to achieve data synchronization between a transmitter side and a receiver side, there is provided another system for adjusting the sampling timing of a DLL circuit, in which, on the transmitter side, the system comprises: error detection/correction code generating means for adding an error detection/correction code to transmission data and outputting the transmission data with the error detection/correction code; means for transmitting, to the receiver side, output bits of the error detection/correction code generating means in which a data bit associated with the DLL circuit to be adjusted is replaced with a sampling timing adjustment pattern; and a spare channel for transmitting the data bit associated with the DLL circuit to be adjusted, and on the receiver side, the system comprises: DLL circuits provided for each bit of received data and the spare channel; means for extracting the outputs of the DLL circuits in which the output of the DLL circuit to be adjusted is replaced with the output of the DLL circuit associated with the spare channel; and error detecting/correcting means for receiving the extracted outputs and performs error detection/correction thereon.

According to the present invention, in a data transmission system that uses a DLL circuit to achieve data synchronization between a transmitter side and a receiver side, there is provided a method for adjusting the sampling timing of a DLL circuit, in which, on the transmitter side, the method comprises: an error detection/correction code generating step of adding an error detection/correction code to transmission data and outputting the transmission data with the error detection/correction code; and a step of transmitting, to the receiver side, output bits of the error detection/correction code generating means in which a data bit associated with the DLL circuit to be adjusted is replaced with a sampling timing adjustment pattern, and on the receiver side, the method comprises: an error detecting/correcting step of receiving the output of a DLL circuit provided for each bit of received data and performing error detection/correction thereon.

According to the present invention, in a data transmission system that uses a DLL circuit to achieve data synchronization between a transmitter side and a receiver side, there is provided another method for adjusting the sampling timing of a DLL circuit, in which, on the transmitter side, the method comprises: an error detection/correction code generating step of adding an error detection/correction code to transmission data and outputting the transmission data with the error detection/correction code; and a step of transmitting, to the receiver side, output bits output in the error detection/correction code generating step in which a data bit associated with the DLL circuit to be adjusted is replaced with a sampling timing adjustment pattern, and transmitting the data bit associated with the DLL circuit to be adjusted using a spare channel, and on the receiver side which comprises DLL circuits provided for each bit of received data and the spare channel, the method comprises: a step of extracting outputs of said DLL circuits in which the output of the DLL circuit to be adjusted is replaced with the output of the DLL circuit associated with the spare channel; and an error detecting/correcting step of receiving the extracted outputs and performing error detection/correction thereon.

According to the present invention, in a data transmission system that uses a DLL circuit to achieve data synchronization between a transmitter side and a receiver side, there is provided a transmitter for adjusting the sampling timing of a DLL circuit, comprising: error detection/correction code generating means for adding an error detection/correction code to transmission data and outputting the transmission data with the error detection/correction code; and means of transmitting, to the receiver side, output bits of the error detection/correction code generating means in which a data bit associated with the DLL circuit to be adjusted is replaced with a sampling timing adjustment pattern.

According to the present invention, in a data transmission system that uses a delay locked loop (DLL) circuit to achieve data synchronization between a transmitter side and a receiver side, there is provided another transmitter for adjusting the sampling timing of a DLL circuit, comprising: error detection/correction code generating means for adding an error detection/correction code to transmission data and outputting the transmission data with the error detection/correction code; means of transmitting, to the receiver side, output bits of the error detection/correction code generating means in which a data bit associated with the DLL circuit to be adjusted is replaced with a sampling timing adjustment pattern; and a spare channel that transmits the data bit associated with the DLL circuit to be adjusted.

According to the present invention, in a data transmission system that uses a delay locked loop (DLL) circuit to achieve data synchronization between a transmitter side and a receiver side, there is provided a receiver for adjusting the sampling timing of a DLL circuit, in which the receiver receives transmission data with an error detection/correction code added thereto on the transmitter side in which a data bit thereof associated with the DLL circuit to be adjusted is replaced with a sampling timing adjustment pattern, and the receiver comprises: a DLL circuit provided for each bit of the received data; and error detecting/correcting means for receiving the output of each DLL circuit and performing error detection/correction thereon.

According to the present invention, in a data transmission system that uses a delay locked loop (DLL) circuit to achieve data synchronization between a transmitter side and a receiver side, there is provided another receiver for adjusting the sampling timing of a DLL circuit, in which the receiver receives transmission data with an error detection/correction code added thereto on the transmitter side in which a data bit thereof associated with the DLL circuit to be adjusted is replaced with a sampling timing adjustment pattern and data composed of a data bit associated with the DLL circuit to be adjusted transmitted thereto via a spare channel, and the receiver comprises: DLL circuits provided for each bit of received data and the spare channel; means for extracting the outputs of the DLL circuits in which the output of the DLL circuit to be adjusted is replaced with the output of the DLL circuit associated with said spare channel; and error detecting/correcting means for receiving the extracted outputs and performing error detection/correction thereon.

BRIEF DESCRIPTION OF THE DRAWINGS

FIG. 5 is a sequence diagram showing in detail the operation according to another embodiment of the present invention.

DETAILED DESCRIPTION OF THE PREFERRED EMBODIMENTS

Figure 1:
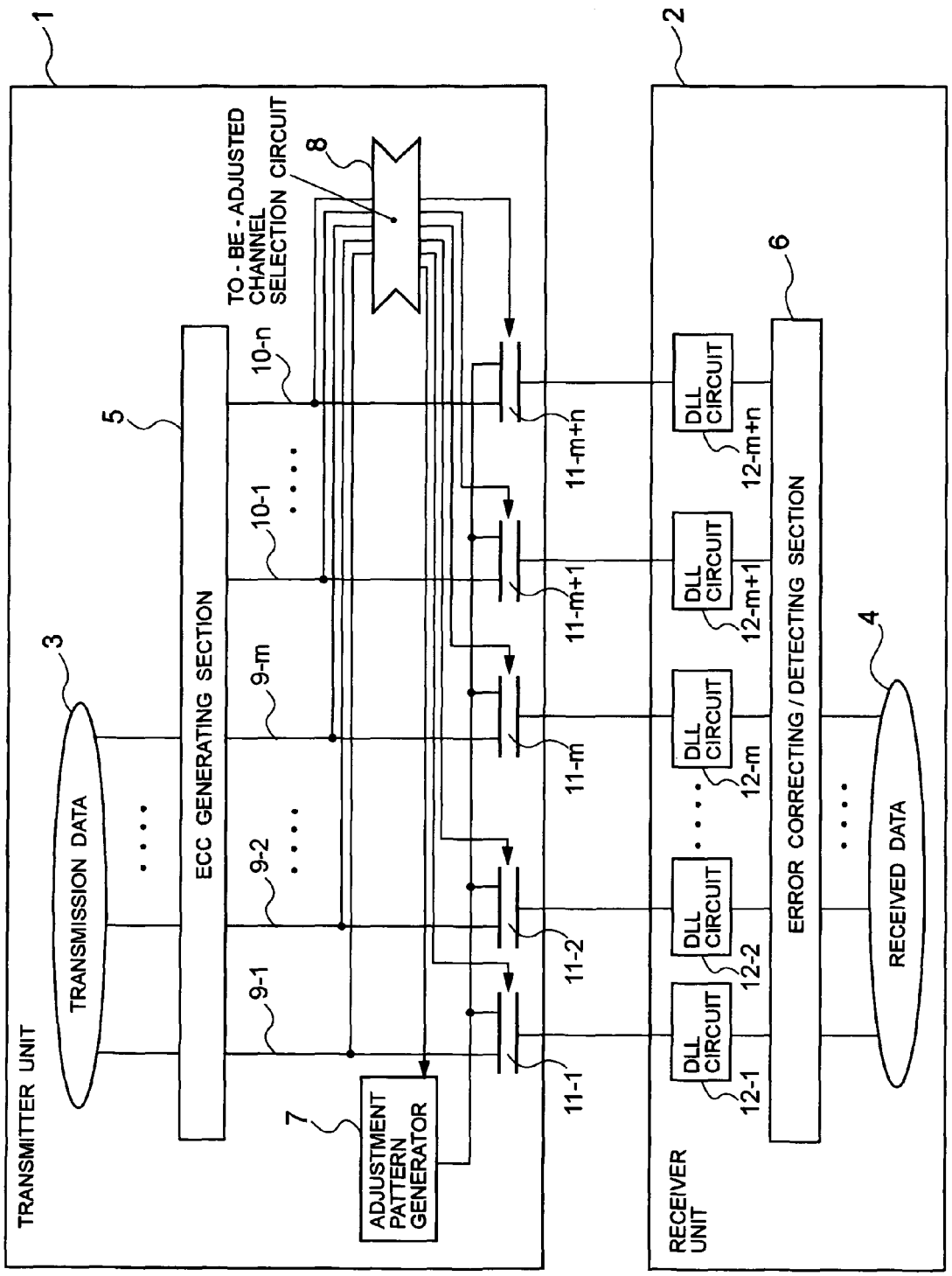
FIG. 1 is a block diagram showing an embodiment of the present invention.

In the following, embodiments of the present invention will be described in detail with reference to the drawings. FIG. 1 is a block diagram showing an embodiment of the present invention. Referring to FIG. 1, data transmission performs between a transmitter unit 1 and a receiver unit 2, transmission data 3, which is to be transmitted by the transmitter unit 1, is provided with parities generated by an ECC generating section 5, and the transmission data 3 with the parities (data channels 9-1 to 9-m and parity channels 10-1 to 10-n) is input to selectors 11-1 to 11-m+n, which are provided for the respective channels, and then supplied to the receiver unit 2. The data channels correspond to data bits, and in the following, the term "channel" will be used instead of the term "bit".

The transmitter unit 1 has an adjustment pattern generator 7, which generates an adjustment pattern for readjusting the sampling timings of DLL circuits 12-1 to 12-m+n in the receiver unit 2. The adjustment pattern is another input to each selector. In addition, the transmitter unit 1 has a circuit 8 for selecting a channel to be adjusted (hereinafter referred to as a to-be-adjusted channel selection circuit), which generates a selection signal for instructing each of the selectors 11-1 to 11-m+n which input is to be selected.

The receiver unit 2 has the DLL circuits 12-1 to 12-m+n, each of which is associated with one of the channels, to achieve synchronization of the transmission data from the transmitter unit 1. An error correcting/detecting section 6 detects and corrects any error in sample data, which is sampled and synchronized by the respective DLL circuits, thereby forming received data 4.

Figure 2:
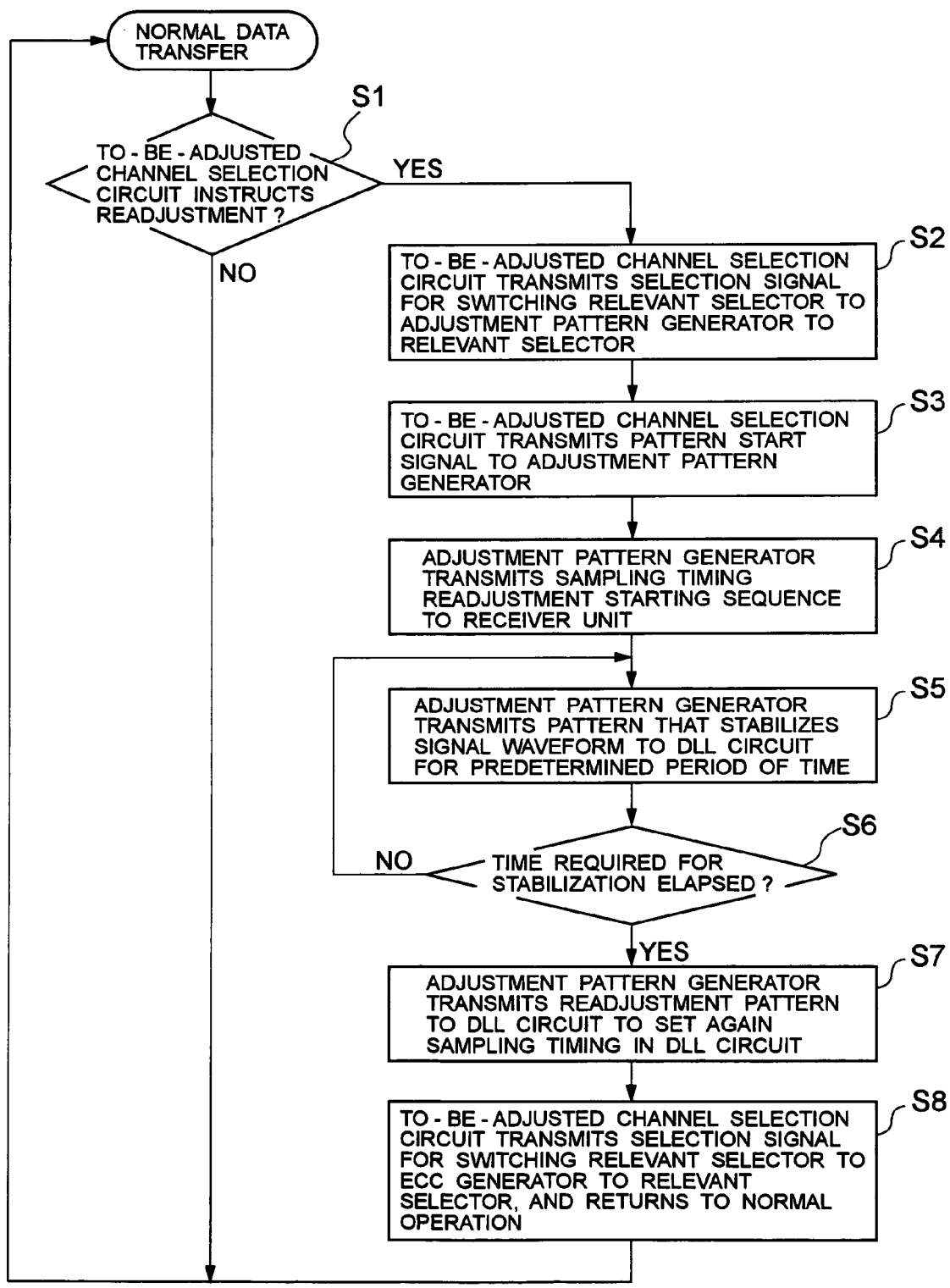
FIG. 2 is a flowchart showing an operation according to the embodiment of the present invention.

FIG. 2 is a flowchart showing an operation according to the embodiment shown in FIG. 1 and described above. Referring to FIG. 2, if it is determined that a channel has to be readjusted (step S1), the to-be-adjusted channel selection circuit 8 transmits a selection signal to the selector associated with the channel to instruct the selector to select and output the signal from the adjustment pattern generator 7 (step S2). At the same time, the to-be-adjusted channel selection circuit 8 transmits a pattern start signal to the adjustment pattern generator 7 (step S3). In response to the signal, the adjustment pattern generator 7 transmits a sampling timing readjustment start sequence to the associated DLL circuit in the receiver unit 2, thereby preparing for readjustment of the DLL circuit is made (step S4).

Then, the adjustment pattern generator 7 supplies a pattern that stabilizes a signal waveform to the DLL circuit for a predetermined period of time (step S5). Once the waveform of the signal between the transmitter unit 1 and the receiver unit 2 is stabilized (step S6), the DLL circuit sets the sampling timing again based on a received readjustment pattern (step S7). Once the readjustment of the sampling timing is completed, in order to return the channel to the normal data transfer state, the to-be-adjusted channel selection circuit 8 transmits a selection signal to the associated selector to instruct the selector to select the output from the ECC generating section 5 (step S8).

According to this embodiment, during readjustment of the sampling timing of a channel, although an error always occurs in one channel, the duration of the readjustment is extremely short. However, the reliability is reduced inevitably. Thus, although the number of interface signals increases, an error correction coding (ECC) system based on double-bit error correction (DEC), rather than on single-bit error correction (SEC), can be used to avoid the reduction of reliability.

The to-be-adjusted channel selection circuit 8 shown in FIG. 1 has a channel controlling function to avoid a correction inability error that occurs when sampling timing readjustment is performed on a plurality of channels simultaneously. The circuit 8 can be configured by adopting regular round robin scheduling or can be implemented by program control.

Figure 3:
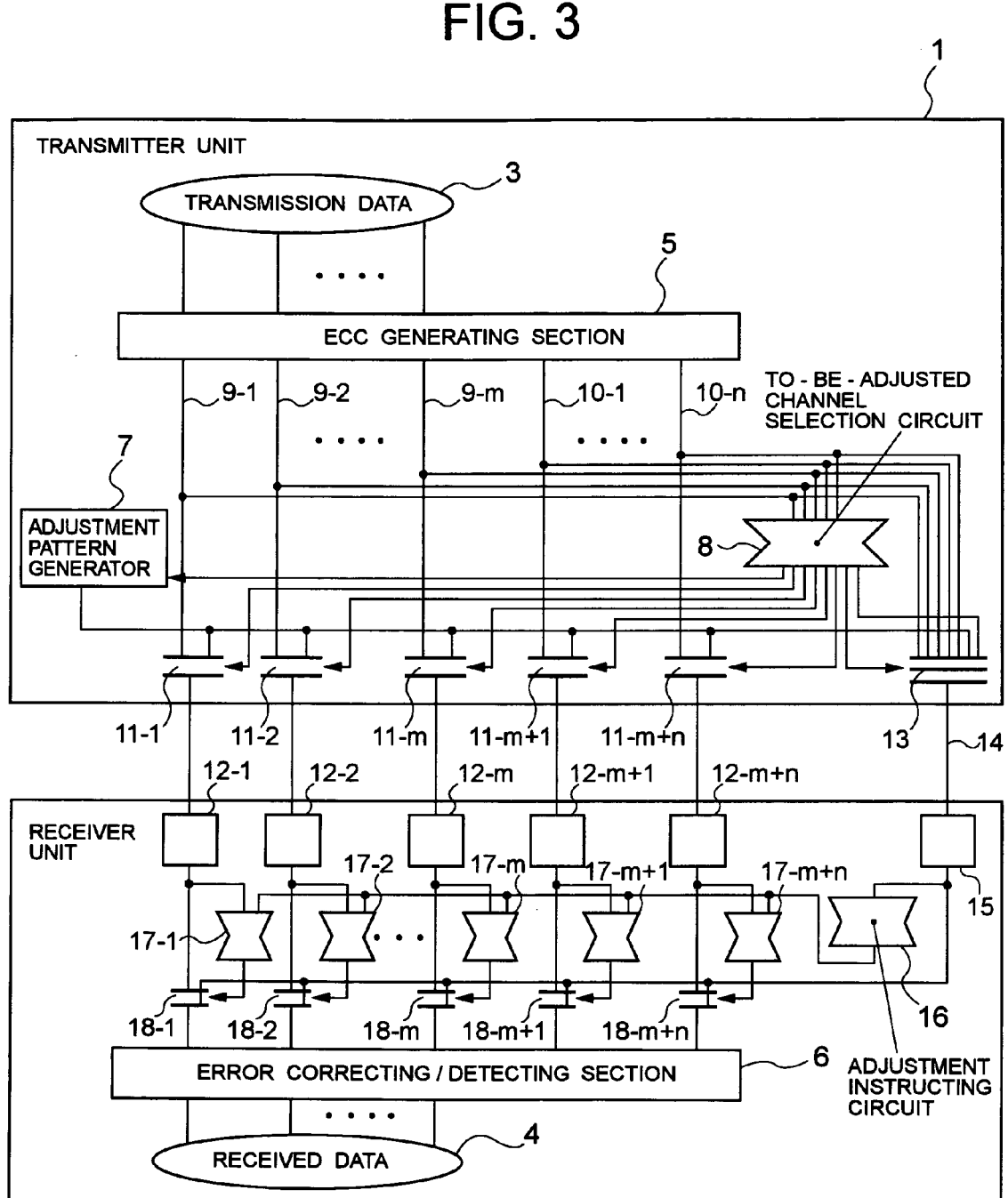
FIG. 3 is a block diagram showing another embodiment of the present invention.

FIG. 3 is a block diagram showing another embodiment of the present invention, in which the same parts as in FIG. 1 are denoted by the same reference numerals. A transmitter unit 1 further has a spare channel selector 13. Under the control of a to-be-adjusted channel selection circuit 8, the transmission data of the channel being currently adjusted, that is, the channel for which an adjustment pattern is being transmitted, is transmitted to a receiver unit 2 as a spare channel 14.

The receiver unit 2 receives the spare channel 14 via a DLL circuit 15. The receiver unit 2 has selectors 18-1 to 18-m+n, each of which receives two inputs, one of which is an output channel from each of DLL circuit 12-1 to 12-m+n, and the other of which is an output channel from the DLL circuit 15 (the spare channel). The selectors 18-1 to 18-m+n are switched according to instructions from determination circuits 17-1 to 17-m+n, respectively. In addition, the receiver unit 2 has an adjustment instructing circuit 16, which identifies selector switching instructions (for the selectors 18-1 to 18-m+n) transmitted thereto via the spare channel 14 and issues switching instructions to the determination circuits 17-1 to 17-m+n. The selector 13 in the transmitter unit 1 makes selections of the transmission data 3, the adjustment pattern and the switching instructions for the selectors 18-1 to 18-m+n.

Figure 4:
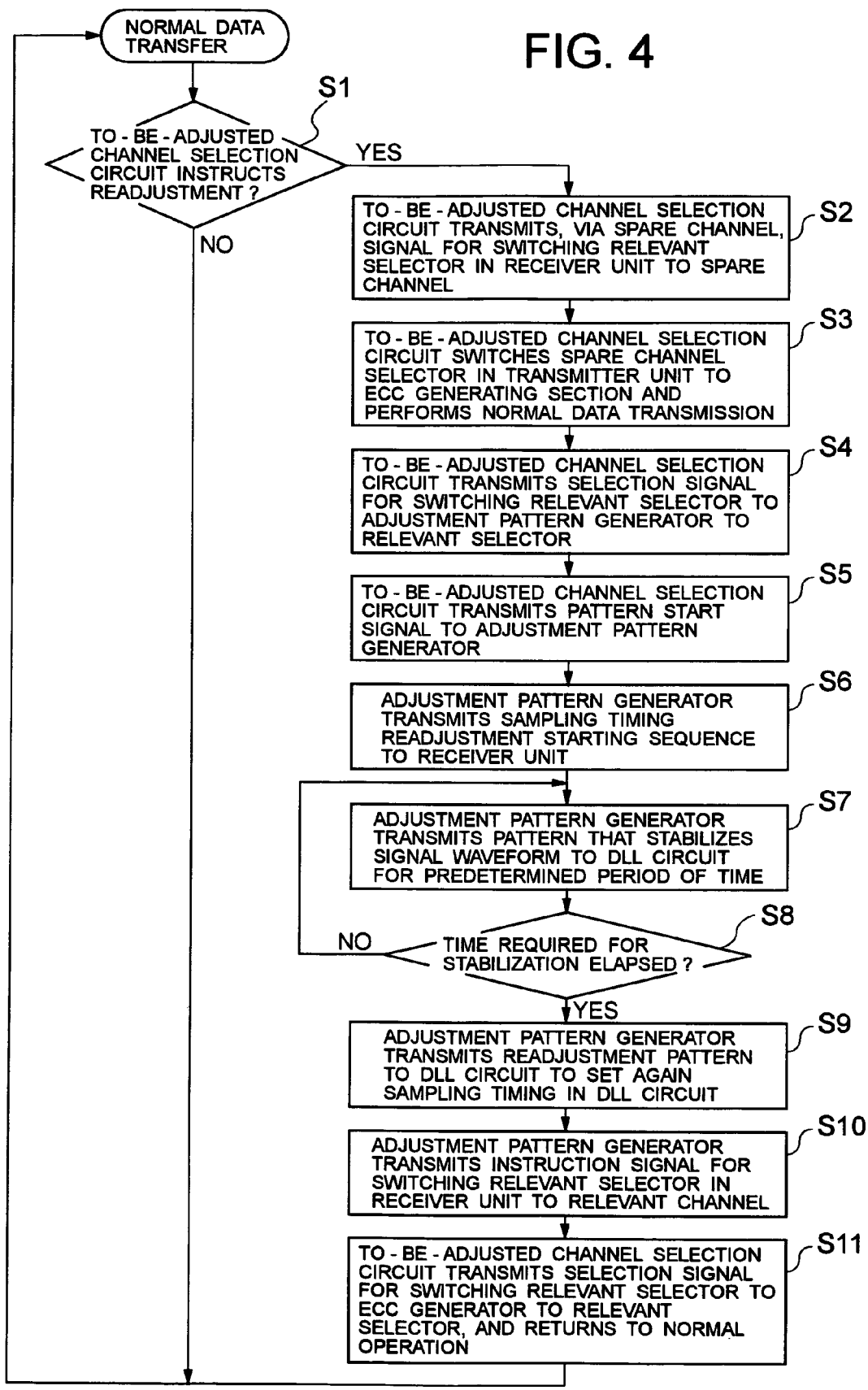
FIG. 4 is a flowchart showing an operation according to another embodiment of the present invention.

FIG. 4 is a flowchart showing an operation according to the embodiment shown in FIG. 3 and described above. Referring to FIG. 4, if it is determined that a channel has to be readjusted (step S1), the to-be-adjusted channel selection circuit 8 instructs, via the spare channel 14, the selector in the receiver unit 2 associated with the channel to switch to the output of the spare channel 14 (step S2). Once the adjustment instructing circuit 16 in the receiver unit 2 receives the instruction, the adjustment instructing circuit 16 instructs the associated determination circuit to switch the associated selector.

At the same time, the to-be-adjusted channel selection circuit 8 switches the selector 13 to the associated channel from an ECC generating section 5, thereby the normal data of the channel to be readjusted is transmitted to the receiver unit 2 via the spare channel 14, and the associated channel in the receiver unit 2 receives the normal data via the spare channel 14 (step S3). Thus, the receiver unit 2 can normally have the received data 4.

Then, the to-be-adjusted channel selection circuit 8 transmits a selection signal to the associated selector to make the selector select the output of the adjustment pattern generator 7 (step S4). The to-be-adjusted channel selection circuit 8 transmits a pattern start signal to the adjustment pattern generator 7 (step S5). The adjustment pattern generator 7 transmits a sampling timing readjustment start sequence to the associated DLL circuit in the receiver unit 2, thereby preparing for readjustment of the associated DLL circuit (step S6).

Then, the adjustment pattern generator 7 supplies a pattern that stabilizes a signal waveform to the DLL circuit for a predetermined period of time (step S7). Once the waveform of the signal between the transmitter unit 1 and the receiver unit 2 is stabilized (step S8), the associated DLL circuit sets the sampling timing again based on a received readjustment pattern (step S9). Once the readjustment of the sampling timing is completed, the adjustment pattern generator 7 transmits an instruction to switch the associated selector in the receiver unit 2 to the associated channel. According to the instruction (decoded), the associated determination circuit in the receiver unit 2 switches the associated selector (step S10). Finally, in order to return the associated channel to the normal data transfer state, the to-be-adjusted channel selection circuit 8 transmits, to the associated selector in the transmitter unit 1, a selection signal for switching the selector to the ECC generating section 5 (step S11).

FIG. 5 shows a timing of switching to the spare channel according to the embodiment shown in FIGS. 3 and 4 in detail. The example shown in FIG. 5 represents a case where the sampling timing of the DLL circuit 12-1 associated with the data channel 9-1 is readjusted. When the to-be-adjusted channel selection circuit 8 determines that the sampling timing of the data channel 9-1 has to be adjusted, the spare channel selector 13 is switched to the to-be-adjusted channel selection circuit 8 to receive a switch instruction signal for the receiver-side selector 18-1 (timing T1). At the succeeding timings, the spare channel selector 13 is switched to the data channel 9-1, and the spare channel 14 transmits, to the receiver unit 2, the data to be transmitted via the normal data channel 9-1.

The spare channel 14 transmits the switch instruction signal for the receiver-side selector 18-1 to the receiver unit 2 (timing T2), and according to the instruction, the adjustment instructing circuit 16 issues an instruction for switching the receiver-side selector 18-1 to the determination circuit 17-1 (timing T3). Thus, at the succeeding timings, the data channel 1 in the receiver unit 2 receives data from the spare channel 14. Immediately after the to-be-adjusted channel selection circuit 8 transmits the switching signal, a selection signal for switching the selector 11-1 associated with the data channel 9-1 to the adjustment pattern generator 7 is transmitted, and readjustment of the sampling timing of the data channel 9-1 is started (timing T4).

Once the readjustment for the data channel 9-1 is completed, the adjustment pattern generator 7 transmits an end code (timing T5), and the determination circuit 17-1 recognizes the end code and switches the receiver-side selector 18-1 to the DLL circuit 12-1 (timing T6). In order that the selector 11-1 associated with the data channel 9-1 can be switched to the ECC generating section 5 immediately after the end code is transmitted, the to-be-adjusted channel selection circuit 8 transmits a selection signal (timing T7) to recover the normal data transfer state.

Here, it is provided that the to-be-adjusted channel selection circuit 8 transmits a spare end signal to the spare channel selector 13 (timing T8), so that, during normal data transfer, the spare channel 14 always transfers data having many transitions from the adjustment pattern generator 7. Thus, it is possible to prevent the sampling timing of the spare channel 14 from being shifted during normal data transfer.

According to this embodiment, since a redundant spare channel 14 is provided, the reliability of the received data can be advantageously prevented from being reduced during readjustment of the sampling timing. Furthermore, the to-be-adjusted channel selection circuit 8 can issue an instruction to readjust the sampling timing of the DLL circuit 15 associated with the spare channel 14.

According to the present invention, readjustment of the sampling timing of a DLL circuit does not inhibit normal data transfer, so that a coding system, such as the 8B10B coding system, that causes performance reduction is no longer necessary. Thus, data synchronization can be advantageously maintained without reducing the data transfer efficiency or degrading the latency. In addition, according to the present invention, an error correcting code (ECC) circuit previously incorporated in the apparatus is typically used, and therefore, the data synchronization can be maintained without increasing the number of interface signals.

What is claimed is:

1. A data transmission system for adjusting the sampling timing of a DLL circuit among a plurality of DLL circuits in a receiver side, comprising:

a transmitter side comprising, error detection/correction code generating means for adding an error detection/correction code to transmission data and outputting the transmission data with the error detection/correction code; means for transmitting, to the receiver side, a plurality of output bits of the error detection/correction code generating means in which one data bit associated with the DLL circuit to be adjusted is replaced with one bit for a sampling timing adjustment; and a spare channel for transmitting the one data bit associated with said DLL circuit to be adjusted, and the receiver side comprising, the plurality of DLL circuits provided for receiving each bit of the plurality of output bits and said spare channel; outputting means for outputting the outputs of each of the plurality of DLL circuits in which the output of said DLL circuit to be adjusted is replaced with the output of the DLL circuit associated with said spare channel; and error detecting/correcting means for receiving the outputs of said outputting means and performing error detection/correction thereon.

2. The system for adjusting the sampling timing of a DLL circuit according to claim 1, wherein the DLL circuit is used to achieve data synchronization between the transmitter side and the receiver side.

3. A method for adjusting a sampling timing of a DLL (delay locked loop) circuit among a plurality of DLL circuits in a receiver side, wherein, on a transmitter side, the method comprises: an error detection/correction code generating step of adding an error detection/correction code to transmission data and outputting the transmission data with the error detection/correction code; and a step of transmitting, to the receiver side, a plurality of output bits output in the error detection/correction code generating step in which one data bit associated with the DLL circuit to be adjusted is replaced with one bit for a sampling timing adjustment, and transmitting the one data bit associated with said DLL circuit to be adjusted using a spare channel, and on the receiver side which comprises the plurality of DLL circuits provided for receiving each bit of the plurality of output bits and said spare channel, the method comprises: an outputting step of outputting the outputs of each of the plurality of DLL circuits in which the output of said DLL circuit to be adjusted is replaced with the output of the DLL circuit associated with said spare channel; and an error detecting/correcting step of receiving the outputs in said outputting step and performing error detection/correction thereon.

4. The method for adjusting the sampling timing of a DLL circuit according to claim 3, wherein the DLL circuit is used to achieve data synchronization between the transmitter side and the receiver side.

5. A transmitter for adjusting the sampling timing of a DLL (delay locked loop) circuit among a plurality of DLL circuits in a receiver side, comprising:

error detection/correction code generating means for adding an error detection/correction code to transmission data and outputting the transmission data with the error detection/correction code;

means for transmitting, to the receiver side, a plurality of output bits of the error detection/correction code generating means in which one data bit associated with the DLL circuit to be adjusted is replaced with one bit for a sampling timing adjustment; and a spare channel for transmitting the one data bit associated with said DLL circuit to be adjusted.

6. The transmitter for adjusting the sampling timing of a DLL circuit according to claim 5, wherein the DLL circuit is used to achieve data synchronization between the transmitter side and the receiver side.

7. A receiver for adjusting a sampling timing of a DLL (delay locked loop) circuit among a plurality of DLL circuits, wherein a receiver receives a plurality of output bits comprising transmission data with an error detection/correction code added thereto on a transmitter side in which one data bit thereof associated with the DLL circuit to be adjusted is replaced with one bit for a sampling timing adjustment and data composed of the one data bit associated with said DLL circuit to be adjusted transmitted thereto via a spare channel, and the receiver comprises:

said plurality of DLL circuits provided for receiving each bit of the plurality of output bits and said spare channel;

means for extracting the outputs of said plurality of DLL circuits in which the output of said DLL circuit to be adjusted is replaced with the output of the DLL circuit associated with said spare channel; and error detecting/correcting means for receiving the extracted outputs and performing error detection/correction thereon.

8. The receiver for adjusting the sampling timing of a DLL circuit according to claim 7, wherein the DLL circuit is used to achieve data synchronization between the transmitter side and the receiver side.

* * * * *